July 14, 1931.  G. J. KEEN  1,814,933
WIRE ROPE CLAMP
Filed Sept. 2, 1930

WITNESS
C. Howard Mann

INVENTOR
G. J. Keen,
BY
Munn & Co.
ATTORNEY

Patented July 14, 1931

1,814,933

UNITED STATES PATENT OFFICE

GEORGE J. KEEN, OF OKLAHOMA CITY, OKLAHOMA

WIRE ROPE CLAMP

Application filed September 2, 1930. Serial No. 479,340.

My invention relates to clamping or gripping means more particularly to a clamp or gripping means for use in securing wire ropes, cables and the like in position and it consists in the combinations, constructions and arrangements herein shown and described.

It is well known to engineers and others making use of cables in structures and the like that it is very difficult to secure the cables in position so that forces exerted thereon tending to tension the cables will not break the connections of said cables to whatever members they may be fastened. It is therefore a primary purpose of my invention to provide a clamp or gripping means for use in clamping cables and the like, which will automatically grip the cable with increased force when the forces tending to move said cable are increased, rather than loosen or break and permit the cable to give way at the connection when the forces exerted thereon are multiplied.

A further object of my invention is to provide a device of the type descrbied in which the parts may be so proportioned and adjusted that the connection formed by my clamp in cooperation with the cable will have the same strength as the cable, thereby making it possible for engineers and others to use a cable for interconnecting members or other purposes which is of uniform strength throughout the length thereof.

A still further object of my invention is to provide a device of the type described which has few parts, is simple to manufacture and does not get out of order easily.

Other objects and advantages will appear as the specification proceeds and the invention will be more particularly defined in the appended claims.

My device is illustrated in the accompanying drawings forming a part of this application, in which:—

Figure 1:
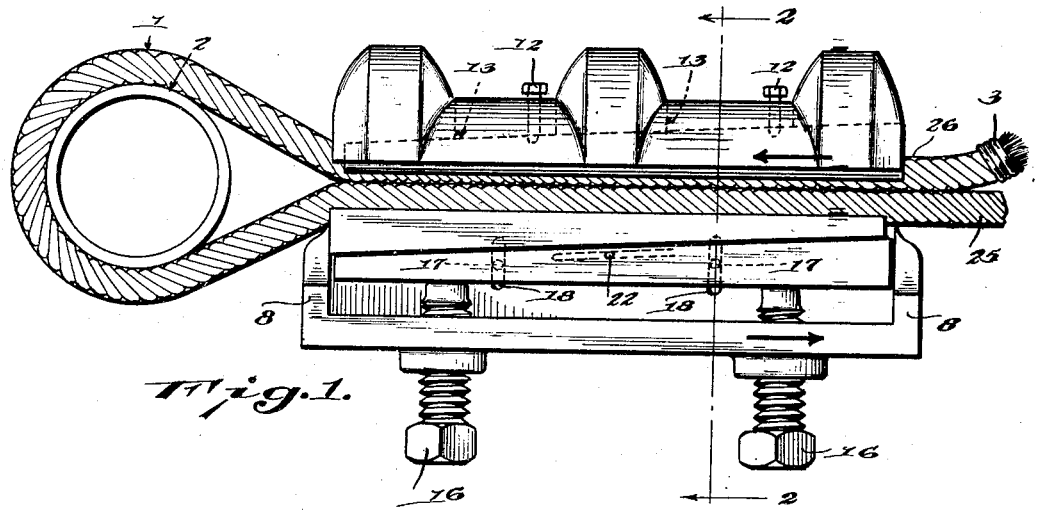
Figure 1 is an elevational view of my device.
Figures 2, 3, 4:
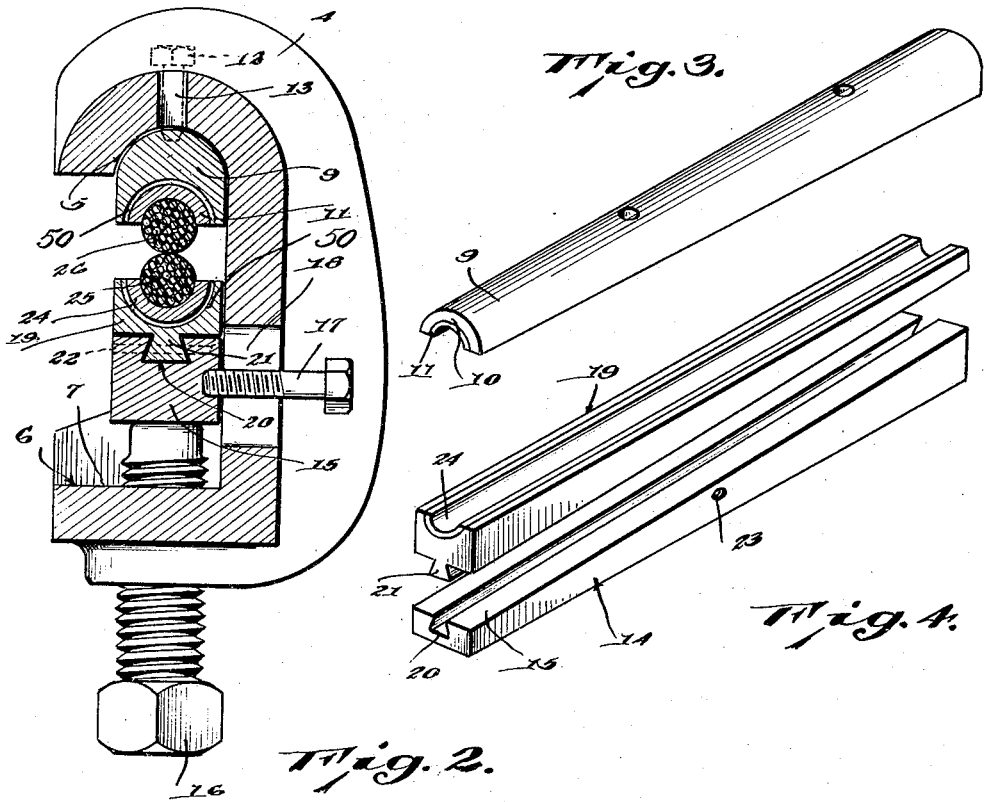
Figure 2 is a sectional view on line 2—2 of Figure 1.
Figures 3 and 4 are perspective detail views of portions of the device.

In applying my invention I make use of an ordinary cable 1 such as is used in telephone line field work and the like, and which it is desired to secure to a member 2, which may be a pole, peg or part of a structure, etc. The clamp is usually applied adjacent the end 3 of the cable after the same has been looped about a member such as the member 2, as shown in Figure 1.

The clamp comprises a body portion 4, which may be made of steel or any other suitable material, and which is proportioned in accordance with the size and strength of the cable it is desired to secure. It provides a pair of opposed clamping portions 5 and 6. The portion 5 is of channel formation and tapered towards one extremity of the body member 4 as appears in Figure 1, for a purpose that will soon appear while the portion 6 is of substantial L-shape in cross section to provide a rectilinear wall 7 opposing the channel portion 5. This wall 7 has end walls 8 which brace the same. It is between these two portions by means that will presently be described, that the strands of cables are secured in tight locked relationship.

For engagement with one of the strands of the cable which it is wished to secure in fixed position the clamp portion 5 has mounted in the channel thereof a tapered slide or slip 9.

This slide is tapered in a direction opposite to the direction in which the channel of portion 5 is inclined. It is also channeled on its inner side as indicated at 10 and provides in said channel a suitable coating 11 of material such as soft metal for gripping the cable.

The member 9 is secured in the channel of portion 5 for reciprocation relative thereto by means of set screws or bolts 12 fastened to the said member and engageable through slots 13 in portion 5.

A similar but oppositely disposed gripping arrangement is provided in cooperation with clamping portion 6 for engagement with the other strand of the cable used in the connection. This comprises a slide or slip member 14, which presents towards the cable a surface which is inclined in a direction opposite to the incline of the channel of portion 5. The member 14 is adjustably related to the portion 6 by means of set screws, which engage therewith and with the wall 7. It is secured in straight line reciprocation towards and away from the wall 7 for purposes of adjustment by means of bolts 17 mounted thereon and sliding in slots 18 in the body member 4.

This member 14 is equipped with a slide or slip 19, which engages with said member 14 in a manner similar to the fashion in which member 9 engages in the channel of portion 5, but with the cooperating walls inclined in a direction opposite to the direction of inclination of the cooperating walls of the channel of portion 5 and slide 9. The member 19 is secured in sliding relationship with member 14 by means of the slot and tongue means consisting of the slot 20 in member 14, and the tongue 21 on member 19 which cooperates with said slot. A slot and pin arrangement comprising the slot 22 in the tongue 21 and the pin 23 in member 14 further secures the parts in sliding relationship as well as limits overtravel of the same relative to one another in the direction of their sliding. The member 19 is channeled in a manner similar to member 9 and provided with a lining 24 of suitable material such as soft metal for gripping the cable.

From the foregoing description the use and operation of the device is easily understood. When it is desired to secure a cable to a member such as the member 2, the end of the cable is thrown or looped about said member, and doubled back on itself. The operator then loosens the screws 16 and brings the members 9 and 19 into engagement with the strands of the cable by tightening the screws 16. The device is then set up in the manner shown in Figure 1.

Upon the exertion of forces on portion 25 of the cable tending to pull the same away from the member 2 the slide 19 will be dragged to the right, that is in the direction of the lower arrow in Figure 1 to move upwardly on the inclined cooperating surface of member 14, and thus grip the cable with greater force, because of the wedging effect produced by this movement.

The exertion of these forces on portion 25 of the cable will also tend to drag portion 26 of the cable to the left as appears in Figure 1, or that is in the direction of the upper arrow in said figure. The movement of this portion of the cable in this direction drags the slide member 9 to the left to carry the same along the channel of clamping portion 5, and grip the portion 26 of the cable with greater force because of its wedging action similar to the wedging action produced by slide 19 and its cooperating surface of member 14.

It is thus seen that the greater the forces tending to loosen the cable the greater the forces tending to grip the cable become, so that when the parts are properly proportioned any desired force may be resisted by the connection.

It is also seen that because of the set screws 16 and the slides 9 and 19 the invention is easily adaptable to cables of varying thicknesses.

The slips 9 and 19 are either cast or molded and are provided with a roughened surface such as pockets, prongs, or transverse ribs which will bite into the soft metal liners 11 and 24 and prevent slippage of said liners.

The soft metal liners 11 and 24 are cast or molded to fit the strands of wire rope which are received by said liner and these liners are made to fit all standard makes with each clamp to hold a liner of a different size. Since these liners are cast in the form to fit the strands of wire rope they will tend to clamp the wire rope more firmly.

I claim:—

1. In a cable clamp, a body member having opposed clamping portions, one of said portions being provided with an inclined channel, an inclined slip adjustably secured to the other of said clamping portions, and oppositely disposed tapered slips slidable in said channel and said inclined slip for engagement with a cable.

2. In a cable clamp, a body member having opposed clamping portions, one of said portions being provided with an inclined channel, an inclined slip adjustably secured to the other of said clamping portions, and means for guiding said slip in straight line reciprocation.

3. A clamp for gripping portions of cables and the like, which tend to move in opposite directions, comprising a body member having clamping portions, surfaces associated with said clamping portions, and inclined in opposite directions, and tapered slips engageable with said surfaces and oppositely disposed relative to one another for engagement with the portions of said cable.

4. A clamp for gripping portions of cables and the like, which tend to move in opposite directions, comprising a body member having clamping portions, surfaces associated with said clamping portions, and inclined in opposite directions, and tapered slips engageable with said surfaces and oppositely disposed relative to one another for engagement with the portions of said cable, whereby upon movement of said cable portions in opposite directions said slips will be moved inwardly to grip said portions with greater force.

5. A clamp for gripping cables and the like comprising a body member having slots, means for engagement with a cable cooperating with said body member, pins on said cable engaging means for cooperation with said slots to guide said cable engaging means, and means for moving said cable engaging means into and out of engagement with the cable.

GEORGE J. KEEN.